(12) United States Patent
Charlier

(10) Patent No.: US 7,669,910 B2
(45) Date of Patent: Mar. 2, 2010

(54) ACOUSTIC DAMPING SECTION WHICH IS DISPOSED BETWEEN A WINDOW PANEL AND THE BODY OF A VEHICLE

(75) Inventor: Julien Charlier, Compiegne (FR)

(73) Assignee: Saint-Gobain Glass France, Courbevoie (FR)

( * ) Notice: Subject to any disclaimer, the term of this patent is extended or adjusted under 35 U.S.C. 154(b) by 307 days.

(21) Appl. No.: 11/574,281

(22) PCT Filed: Aug. 29, 2005

(86) PCT No.: PCT/FR2005/050688

§ 371 (c)(1),
(2), (4) Date: Feb. 26, 2007

(87) PCT Pub. No.: WO2006/032802

PCT Pub. Date: Mar. 30, 2006

(65) Prior Publication Data

US 2007/0284916 A1    Dec. 13, 2007

(30) Foreign Application Priority Data

Sep. 16, 2004  (FR) .................................. 04 09807

(51) Int. Cl.
*B60J 7/00* (2006.01)

(52) U.S. Cl. .......................................................... 296/93
(58) Field of Classification Search ................ 296/84.1, 296/93

See application file for complete search history.

(56) References Cited

U.S. PATENT DOCUMENTS 7,438,352 B2 * 10/2008 Albu et al. ................... 296/208
2001/0051260 A1   12/2001 Johnson et al.

FOREIGN PATENT DOCUMENTS

| DE | 195 43 192 | 5/1997 |
| DE | 198 06 122 | 8/1999 |
| EP | 0 844 075 | 5/1998 |
| FR | 2 843 227 | 2/2004 |
| WO | 2004 039581 | 5/2004 |

* cited by examiner

*Primary Examiner*—Joseph D Pape
(74) *Attorney, Agent, or Firm*—Oblon, Spivak, McClelland, Maier & Neustadt, L.L.P.

(57) ABSTRACT

A sealing strip configured to be combined between a vehicle bodywork and glazing, and including an acoustic damping mechanism when subjected to action of a vibrational field. The sealing strip works in shear combined with local movements of the glazing in its plane, while the bodywork deforms in the direction of the local normal to the glazing.

11 Claims, 2 Drawing Sheets

US 7,669,910 B2

ACOUSTIC DAMPING SECTION WHICH IS DISPOSED BETWEEN A WINDOW PANEL AND THE BODY OF A VEHICLE

BACKGROUND OF THE INVENTION

The present invention relates to a strip intended to be combined between a vehicle bodywork and glazing with a view to forming an acoustic damping means to absorb the vibration waves transmitted through the glazing and bodywork of the vehicle.

Such a strip may be used in particular for vehicle, particularly motor vehicle, lazing, with a view to improving the acoustic comfort of its interior.

In a motor vehicle, the sources of annoyance of mechanical, thermal, visibility, etc. origin have gradually been overcome. However, improvement in acoustic comfort is still very much an ongoing concern.

Aerodynamic noise, that is to say noise created by the friction of the air over the moving vehicle, has, at least in part, been dealt with at its source, that is to say that in order to save energy, the shapes have been modified, thus improving penetration through the air and reducing the turbulence which itself is a source of noise. Among the walls of a vehicle that separate the source of external aerodynamic noise from the interior space where the passenger is situated, the windows are obviously the most difficult to deal with. It is not possible to use pasty or fibrous absorbents that are reserved for the opaque walls, and for practical or weight reasons, the thicknesses cannot be increased without due consideration. European patent EP-B1-0 387 148 proposes glazings which provide good insulation against noise of aerodynamic origin without their weight and/or thickness being excessively increased. The patent thus proposes laminated glazing in which the interlayer has a flexural damping factor $\upsilon = \Delta f / f_c$ of greater than 0.15, the measurement being carried out by exciting, by means of a shock, a laminated bar 9 cm long and 3 cm wide made of a laminated glass in which the resin is between two panes each 4 mm thick and by measuring $f_c$, the resonant frequency of the first mode, and $\Delta f$ the width of the peak at an amplitude $A/\sqrt{2}$ where A is the maximum amplitude at the frequency $f_c$ such that its acoustic attenuation index does not differ, for any of the frequencies above 800 Hz, by more than 5 dB from a reference index increasing by 9 dB per octave up to 2000 Hz and by 3 dB per octave at the higher frequencies. In addition, the standard deviation $\sigma$ of the differences in its acoustic attenuation index with respect to the reference index remains lower than 4 dB. The thicknesses of the two glass panes may be identical and equal to 2.2 mm. That patent thus proposes a general solution to the problem of acoustic insulation of a vehicle against aerodynamic noise.

By contrast, the treatment of glazing against solid-borne noise, that is to say against noise transmitted via solid bodies and in the frequency domain from 50 to 300 Hz or even 800 Hz, is more difficult to achieve. This is because it turns out that the use of connecting pieces is not enough to avoid the transmission of noise by vibration of the glazing. Indeed it has been found that at certain engine speeds, a humming noise perceivable by the passenger occurs and thus causes a source of annoyance. What happens is that the turning-over of the engine creates vibrations which are transmitted, for example, to the bodywork and thus, through a chain effect, to the glazing. It is known that the energy acquired by an object subjected to a shock generates a vibration phenomenon and that, immediately after the shock, the object that has become free again vibrates in its natural mode. A vibrational frequency is associated with each mode. The amplitude of the vibration depends on the initial excitation, that is to say on the spectral component of the shock (the amplitude of the shock at the frequency studied) and on the area of impact of the shock, the modal deformation being greater or smaller according to whether the shock occurs at a vibration antinode or at a vibration node.

For a natural mode to be excited, it is necessary:

(1) for the deformation caused at the point of impact not to be situated on a vibration node of the mode, and (2) for the energy spectrum of the shock to have a component at the resonant frequency of the mode.

The latter condition is practically always satisfied because a very brief shock exhibits a practically uniform energy spectrum.

The first condition is also satisfied, and, for a bar that is free at both ends, for example, all that is required is for one of the ends to be attacked and all the flexural modes will be excited.

Solid-borne excitation is peripheral and it has been demonstrated that, at certain vibrational frequencies of the engine, that is to say at certain engine speeds, at least one of the glazings has a vibration mode and the cabin of the vehicle has an acoustic mode, the coupling between these two modes amplifying the hum resulting from the acoustic radiation via the glazing of the energy originating, in this instance, from the engine. Of course, engine speed that gives rise to these phenomena is specific to each type of vehicle and cannot thus be generalized to a single value.

Hence, in order to improve acoustic comfort in the cabin of the vehicle with respect to solid-borne noise, patent EP 0 844 075 proposes laminated glazing comprising at least one interlayer film possessing very satisfactory damping qualities as regards solid-borne audible noise because it has a loss factor tan δ greater than 0.6 and a shear modulus G' of less than $2 \cdot 10^7$ N/m², in a temperature range between 10 and 60° C.

A solution that may be an alternative or a supplement to the use of glazing with an acoustic damping property may be to combine around the periphery of the glazing a strip that has an acoustic damping property. Patent application WO 04/012952 discloses a strip which, in order to provide such an acoustic damping property, has to have a real equivalent stiffness per unit length $K'_{eq}$ at least equal to 25 MPa, combined with an equivalent loss factor tan $\delta_{eq}$ at least equal to 0.25.

The equivalent stiffness per unit length is the equivalent stiffness of the strip per linear meter of strip.

The equivalent strip stiffness is the stiffness of the entirety of the strip irrespective of the number of materials or their constitution.

The stiffness is a quantity that relates the deformations of the strip to the loadings applied to it. The stiffness is defined by the rigidity of the materials that make up the strip and by the geometry of the strip, the rigidity being a quantity characteristic of the material and dependent on the Young's modulus and/or the shear modulus. The Young's modulus is related to the stresses and deformations experienced by the material when working in tension-compression, while the shear modulus is related to the stresses and deformations experienced by the material when working in shear.

The equivalent loss factor tan $\delta_{eq}$ is the loss factor of the entirety of the strip regardless of the number of materials and their constitution.

The loss factor is defined by the ratio between the dissipative power, that is to say the conversion of the energy of deformation of the strip into heat energy throughout the strip, and the stiffness per unit length.

In order to determine the real equivalent stiffness per unit length $K'_{eq}$ and the equivalent loss factor tan $\delta_{eq}$ of a strip made up of one or more materials, these quantities are estimated using a visco-analyzer. The visco-analyzer measures the real equivalent stiffness $K'_{eq}$ and the equivalent dissipative power $K''_{eq}$ of a specimen of strip of a cross section identical to that of the strip and of a length L then the following calculations are carried out:

the ratio between the measured real equivalent stiffness and the length L of the strip in order to obtain the real equivalent stiffness per unit length $K'_{eq}$ of the strip;

the ratio between the measured equivalent dissipative power and the measured real equivalent stiffness in order to obtain the equivalent loss factor tan $\delta_{eq}$ of the strip.

In this type of strip mentioned hereinabove only stresses and deformations experienced by the material when working in tension-compression in the direction normal to the glazing are taken into consideration work in shear being negligible. This is because the bodywork is so rigid by comparison with the strip that it does not deform and cannot absorb vibrational energy. Only the strip deforms significantly and dissipates mechanical energy by working mainly in tension-compression.

SUMMARY OF THE INVENTION

Now, the inventors have noticed that for certain types of vehicle, the bodywork may not be as rigid which means that it does deform and reduces the work of the strip and therefore the dissipation of mechanical energy by this strip. Hence, with a strip exhibiting the characteristics mentioned hereinabove with a real equivalent stiffness per unit length $K'_{eq}$ of at least 25 MPa, combined with an equivalent loss factor tan $\delta_{eq}$ at least equal to 0.25, the noise reduction performance is not in fact as expected.

It is therefore an object of the invention to provide another solution involving a strip with an acoustic damping property which is fully able to perform its function when fixed to a bodywork, the deformations of which limit the work of the strip in the direction normal to the glazing.

According to the invention the strip is characterized in that it constitutes an acoustic damping means when subjected to the action of a vibrational field; it works in shear combined with local movements of the glazing in its plane, while the bodywork deforms in the direction of the local normal to the glazing.

The dissipation through the strip's work in shear is defined by the Q-factor A that the strip has, this Q-factor being less than or equal to 4.

The Q-factor A is determined by the ratio of the maximum receptance $R_1$ to the shear-mode qasi-static receptance $R_0$. More specifically, the receptance R(f) is the frequency response function that gives the ratio of the frequency-dependent displacement of a weight to the force applied to it, the weight being mounted between two metal supports by means of two specimens of the strip.

The maximum receptance $R_1$ is defined as the value of the receptance R(f) on the local maximum of lowest frequency and which corresponds to the mode of suspension of the weight from the specimen of strip. The frequency at which this maximum is attained is denoted $f_1$.

The shear-mode quasi-static receptance $R_0$ is defined as the value of the receptance R(f) measured when the frequency equals $f_1/10$.

The Q-factor A is therefore defined by the ratio of the maximum receptance to the shear-mode quasi static receptance $R_1/R_0$.

The inventors also demonstrated that the criterion given for the Q-factor A may be associated with a criterion on the receptance $R_0$ of the strip which needs advantageously to be greater than or equal to $3 \cdot 10^{-6}$ m/N.

According to another feature, the strip is made of just one or several materials stacked together.

As a preference, the material or materials has or have properties of adhesion with at least the glazing and/or the bodywork.

A preferred example of a material is a one-component polyurethane and, more particularly, silane-terminated one-component polyurethane, the material having two glass transitions, in two very distinct temperature regions.

According to another feature, the strip has a uniform or non-uniform cross section over all or part of its length.

The strip is applied to at least one of the elements that are the glazing and the bodywork by a method of extrusion and/or encapsulation and/or transfer molding and/or injection molding.

The strip may be combined with a motor vehicle bodywork, it being possible in particular for the glazing of the vehicle to be laminated glazing comprising at least two sheets of glass and a film having acoustic properties. Reference may be made to patent applications EP 0 100 701 and EP 0 844 075 with regard to the criteria that a film with acoustic properties must satisfy.

The invention also proposes a method for determining the dissipative property of a strip intended to be combined between a vehicle bodywork and glazing, the method being characterized in that it consists in establishing the Q-factor A of the strip which is determined as the ratio of the maximum receptance $R_1$ to the shear-mode quasi-static receptance $R_0$, the receptance being the frequency response function that gives the ratio of the frequency-dependent displacement of a weight to the force applied to it, the weight being mounted between two metal supports by means of two specimens of the strip, the strip having dissipative properties when the Q-factor A is less than or equal to 4.

According to this method, the shear-mode quasi-static receptance $R_0$ is greater than or equal to $3 \cdot 10^{-6}$ m/N. The inventors have thus demonstrated the benefit of using a strip combined between a vehicle glazing and bodywork for dissipating vibrational energy that causes the noise radiated by the glazing and/or the bodywork when the strip works in shear combined with local movements of the glazing in its plane, while the bodywork deforms in the direction normal to the glazing.

In its use for dissipating vibrational energy, the strip advantageously exhibits the characteristics mentioned hereinabove. A suitable material and appropriate dimensions will need to be chosen according to the shortest dimensions (height and width) of the strip in order to arrive at a Q-factor of 4 or lower.

BRIEF DESCRIPTION OF THE DRAWINGS

Other advantages and characteristics of the invention will become apparent in the remainder of the description, with reference to the attached drawings in which.

DETAILED DESCRIPTION OF THE PREFERRED EMBODIMENT

Figure 1:
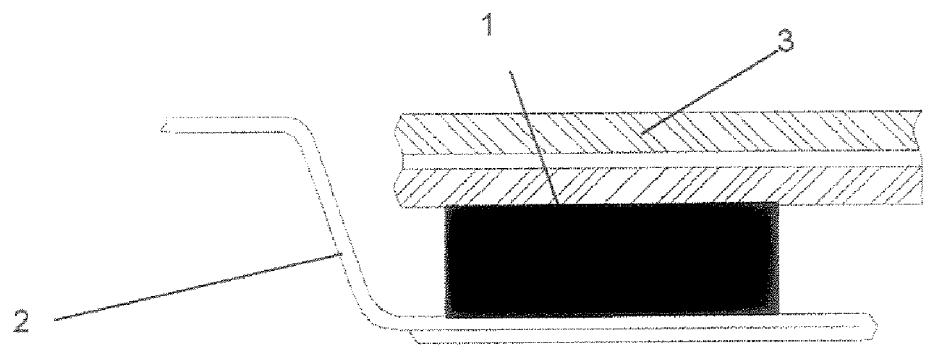
FIG. 1 is a sectioned part view of a strip according to the invention combined between the bodywork of a vehicle and glazing.

FIG. 1 depicts a schematic part view of an acoustic damping strip 1 combined between the bodywork 2 and the glazing 3 of a vehicle, for example a motor vehicle. The acoustic damping generated by this strip is a result of its ability to work in shears in deformation parallel to the plane of the glazing, while the bodywork is able to work in tension-compression.

The strip may be made of a single material or of several materials arranged in layers such as a stack of materials stacked in the heightwise and/or widthwise direction of the strip.

Its function of dissipating energy while working in shear is defined by the Q-factor A that the strip has. According to the invention, this Q-factor needs to be equal to 4 or lower.

As explained above, the Q-factor A is determined by calculating the ratio of the maximum receptance $R_1$ to the shear-mode quasi-static receptance $R_0$.

In order to determine the acoustic damping properties or otherwise of a strip, it is thus necessary to establish what its Q-factor A is.

Figure 2:
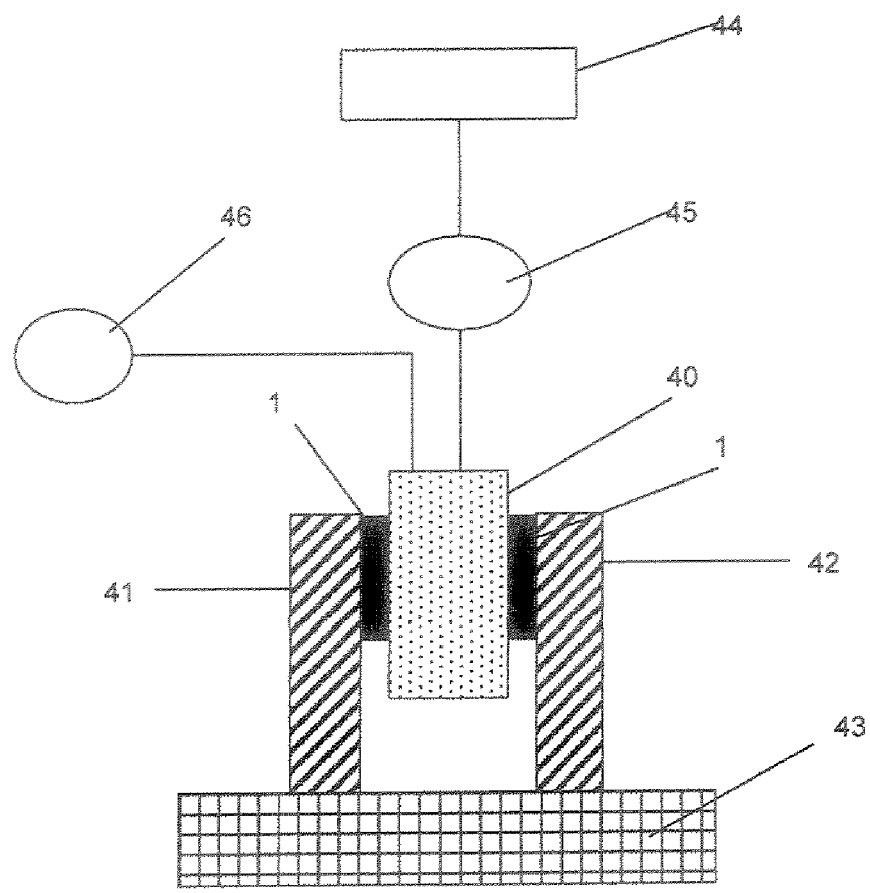
FIG. 2 schematically illustrates the device used to measure the receptance that characterizes the strip.

The procedure illustrated schematically in FIG. 2 for measuring receptance is as follows: a weight 40 weighing 0.025 kg and made up of a rectangular parallelepipedal steel block is fixed between two steel uprights 41 and 42 using two specimens of the strip 1. The uprights are themselves secured to a slab 43, for example, by appropriate bonding. The uprights, the specimens of the strip and the weight are secured by rigid bonding for example, by using a cyanoacrylate adhesive, without any preload other than that due to the self-weight of the various components. The specimens of strip are 0.02 m long and have the same cross section as when mounted between the bodywork and the glazing. They are orientated in such a way as to be positioned between an upright and the weight as between the bodywork and the glazing.

The weight is excited vibrationally using an electrodynamic pot 44 connected to it via a force transducer 45. The load signal delivered by the electrodynamic pot is made up of white noise at least over the frequency band from 40-1000 Hz. The force measured by the force transducer 45, in N, is denoted F.

At the same time, the acceleration of the weight 40 is measured using an accelerometer 46 weighing less than 0.005 kg. The acceleration measured by the accelerometer 46, in m/s$^2$, is denoted $\gamma$.

The load applied by the electrodynamic pot and the acceleration of the weight are measured in the same direction, directed parallel to the length of the specimens of strip and in the mid-plane of the two uprights. As a result the movement of the weight resides in the specimens of strip working in shear, in their longitudinal direction.

The modulus of the frequency response function [$\gamma$/F] relating the acceleration measured to the force applied to the weight as a function of the frequency, is determined in fine bands. The receptance R(f) as a function of the frequency f can be deduced therefrom as follows. $R(f)=|\gamma/F|/(2\pi f)^2$.

The maximum receptance $R_1$ is determined this being defined as the value of the receptance R(f) on the local maximum, the frequency of which is the lowest and which corresponds to the mode of translational suspension of the weight from the specimens of strip, in the longitudinal direction of the strip specimens. The frequency at which this maximum is attained is denoted $f_1$.

The shear-mode quasi-static receptance $R_0$ is defined as the value of the receptance R(f) measured when the frequency is equal to $f_1/10$.

Having determined $R_1$ and $R_0$, the Q-factor A is calculated using the ratio $R_1/R_0$. Two examples of strips P1 and P2 which respectively meet and do not meet the criterion of having a Q-factor A of 4 or lower are given hereinafter. The strip P1 of the invention is made of a rectangular bead 10 mm wide and 5 mm thick made of one-component polyurethane and more particularly of silane-terminated one-component polyurethane, the product having two glass transitions in two very different temperature regions. It has the property of adhering the glass to the bodywork. Its Q-factor, determined using the protocol set out hereinabove, is 1.3.

The strip P2 is made of a rectangular bead 12 mm wide and 6 mm thick of polyurethane mastic, for example, Gurit marketed by Dow Automotive, a material that is well known in automotive construction for fixing glazing to bodywork. Its Q-factor, determined according to the protocol set out hereinabove, is 5.2.

These two strips were used independently to fix monolithic glazing to a motor vehicle bodywork. In both instances noise transfer measurements were taken: simultaneous measurement of the force applied by an impact hammer to the glazing and of the interior noise generated by this same impact allowed a frequency response function [p/F], called noise transfer, to be deduced, p being the acoustic pressure measured at the ears of a passenger and F being the force produced by the impact hammer at the center of the glazing. The higher the vibro-acoustic coupling between the glazing and the car body, the higher the noise transfer. In other words, an acoustic improvement is obtained when the noise transfer level is reduced.

Figure 3:
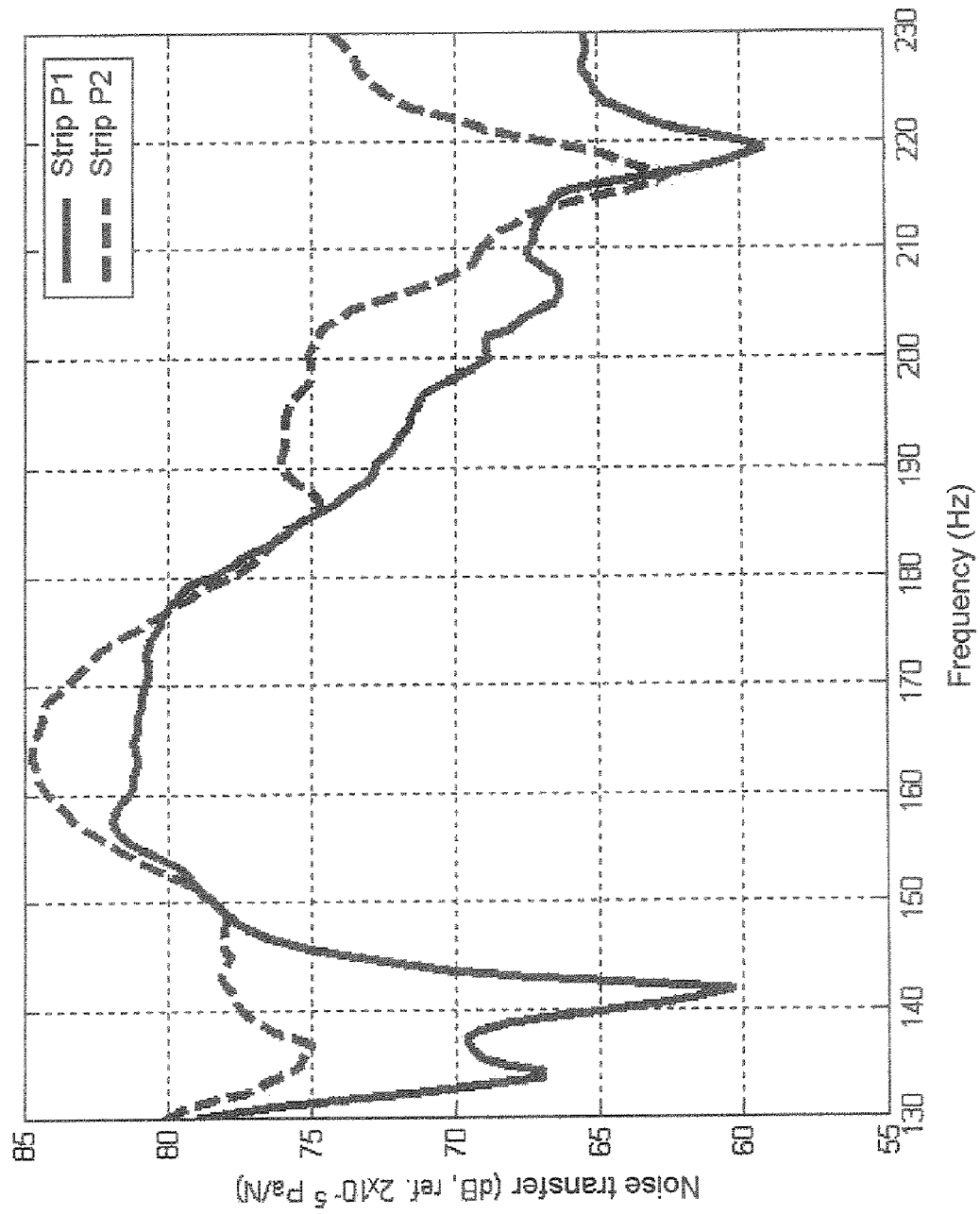
FIG. 3 shows curves of comparative noise-transfer measurements as a function of the frequency taken on a vehicle comprising in particular a strip of the invention.

FIG. 3 sets out noise transfer results obtained with the strips P1 and P2 as a function of frequency over the range 130-230 Hz. It can be seen that use of the strip P1, that meets the criterion of having a Q-factor of 4 or lowers allows the noise transfer to be reduced and therefore allows the acoustic performance of the glazing-bodywork system to be improved.

The invention claimed is:

1. A sealing strip configured to be positioned between a vehicle bodywork and glazing and constituting an acoustic damping means when subjected to action of a vibrational field,
   wherein the strip works in shear combined with movements of the glazing in the plane of the glazing at the location of the strip, while the bodywork deforms in the direction normal to the glazing at the location of the strip,
   wherein the work of the strip in shear is defined by a Q factor of the strip, the Q factor being less than or equal to 4 and determined by a ratio of a maximum receptance of the strip to a shear-mode quasi-static receptance of the strip, the receptance of the strip being a frequency response function that gives rise to a ratio of a frequency-dependent displacement of a weight to a force applied to the weight, the weight being mounted between two metal supports by specimens of the strip.

2. The strip as claimed in claim 1, wherein the receptance of the strip is greater than or equal to $3 \cdot 10^{-6}$ m/N.

3. The strip as claimed in claim 1, wherein the strip is made of just one or plural materials stacked together.

4. The strip as claimed in claim 3, wherein the one or plural materials has or have properties of adhesion with at least the glazing and/or the bodywork.

5. The strip as claimed in claim 1, wherein the material of the strip is a one component polyurethane or silane-terminated one-component polyurethane, the material having two glass transitions, in two distinct temperature regions.

6. The strip as claimed in claim 1, applied to at least one of plural elements that are the glazing and the bodywork by a method of extrusion and/or encapsulation and/or transfer molding and/or injection molding.

7. The strip as claimed in claim 1, wherein the strip has a uniform or non-uniform cross section over all or part of its length.

8. The strip as claimed in claim 1, combined with the bodywork of a motor vehicle.

9. The strip as claimed in claim 1, combined with a laminated glazing comprising at least two sheets of glass and a film with acoustic properties.

10. A strip positioned between a vehicle glazing and bodywork for acoustic damping of vibrational radiation to which the glazing and/or the bodywork is exposed, wherein the strip works in shear combined with movements of the glazing in the plane of the glazing at the location of the strip, while the bodywork deforms in the direction normal to the glazing at the location of the strip, wherein the work of the strip in shear is defined by a Q factor of the strip, the Q factor being less than or equal to 4 and determined by a ratio of a maximum receptance of the strip to a shear-mode quasi-static receptance of the strip, the receptance of the strip being a frequency response function that gives rise to a ratio of a frequency-dependent displacement of a weight to a force applied to the weight, the weight being mounted between two metal supports by specimens of the strip.

11. The use of a strip as claimed in claim 1.

* * * * *

UNITED STATES PATENT AND TRADEMARK OFFICE
CERTIFICATE OF CORRECTION

PATENT NO.        : 7,669,910 B2
APPLICATION NO.   : 11/574281
DATED             : March 2, 2010
INVENTOR(S)       : Julien Charlier It is certified that error appears in the above-identified patent and that said Letters Patent is hereby corrected as shown below:

Column 1, line 12, change "lazing, with a view" to --glazing, with a view--.

Signed and Sealed this

Seventeenth Day of August, 2010

David J. Kappos
*Director of the United States Patent and Trademark Office*